United States Patent [19]

Lee

[11] Patent Number: 5,053,457

[45] Date of Patent: Oct. 1, 1991

[54] COEXTRUDABLE ADHESIVES AND PRODUCTS THEREFROM

[75] Inventor: I-Hwa Lee, Wilmington, Del.

[73] Assignee: E. I. Du Pont de Nemours and Company, Wilmington, Del.

[21] Appl. No.: 365,593

[22] Filed: Jun. 13, 1989

[51] Int. Cl.$^5$ .............................................. C08L 33/02
[52] U.S. Cl. ..................................... 525/78; 428/483; 525/74; 525/207; 525/222
[58] Field of Search ........................................... 525/78

[56] References Cited

U.S. PATENT DOCUMENTS

| | | | |
|---|---|---|---|
| 4,058,647 | 11/1977 | Inoue et al. | 428/474 |
| 4,230,830 | 10/1980 | Tanny et al. | 525/222 |
| 4,332,655 | 6/1982 | Berekja | 204/159 |
| 4,548,348 | 4/1986 | Nagano | 525/207 |
| 4,640,870 | 2/1987 | Akazawa et al. | 428/483 |
| 4,732,795 | 3/1988 | Ohya et al. | 428/36 |

FOREIGN PATENT DOCUMENTS 63-258941 10/1988 Japan .

*Primary Examiner*—John C. Bleutge
*Assistant Examiner*—D. E. Aylward

[57] ABSTRACT

A coextrudable adhesive composition comprises a blend of (a) a copolymer of ethylene with alkyl acrylate or methacrylate comonomer and a grafted comonomer containing pendant carboxylic acid or carboxylic acid derivative functionality, and (b) a copolymer of ethylene with at least one comonomer selected from the group consisting of alpha olefins, nonconjugated dienes, vinyl esters of carboxylic acids, styrene, alkyl acrylates, and alkyl methacrylates, wherein component (b) is incompatible with component (a).

22 Claims, No Drawings

COEXTRUDABLE ADHESIVES AND PRODUCTS THEREFROM

BACKGROUND OF THE INVENTION

This invention relates to a coextrudable adhesive composition suitable for bonding composite structures of structural layers and barrier layers.

Copending U.S. patent application No. 07/202,033, filed June 3, 1988 by the present inventor discloses a blend of ethylene vinyl acetate copolymer, ethylene vinyl acetate copolymer modified by grafting with a comonomer containing pendant acid or acid derivative functionality, and impact modified polystyrene, which provides a useful adhesive, particularly for bonding polystyrene to gas barrier polymers.

Copending U.S. patent application No. 07/237,171, filed August 28, 1988 by the present inventor discloses an adhesive blend of a copolymer of ethylene and e.g. an ester of an unsaturated mono- or dicarboxylic acid with a grafted comonomer containing pendant carboxylic acid or carboxylic acid derivative functionality, wherein the amount of said grafted comonomer comprises about 0.03 to about 0.5 percent by weight of the total bonding resin composition, a second similar copolymer (ungrafted), polystyrene, and a saturated alicyclic hydrocarbon resin.

U.S. Pat. No. 4,640,870 discloses a laminate structure with a bonding interlayer of a polymer of ethylene-acrylate ester-ethylenic unsaturated carboxylic acid or anhydride, and a polymer of ethylene-acrylate ester.

U.S. Pat. No. 4,548,348 discloses an adhesive composition of an ethylene-unsaturated carboxylic acid copolymer and a thermoplastic elastomer such as ethylene/propylene/diene terpolymer. The acid copolymer can contain units of other monomers, i.e. alkyl esters such as methyl acrylate.

U.S. Pat. No. 4,230,830 discloses polymeric blends particularly useful as adhesives for nylon, prepared from an ethylene polymer such as ethylene/methyl acrylate copolymer, and a high density ethylene polymer grafted with succinic groups.

U.S. Pat. No. 4,732,795 discloses a heat shrinkable laminate tubular film which includes adhesive layers. The adhesive is a copolymer of ethylene and an ester of acrylic acid, and a similar copolymer modified with an unsaturated carboxylic acid, further modified with a metal.

U.S. Pat. No. 4,058,647 discloses a laminate of a modified polyolefin composition and a second layer of polyester, polyamide, or hydrolyzed copolymer of ethylene vinyl acetate, prepared without an adhesive. The modified polyolefin composition includes a polyolefin grafted with an unsaturated acid or anhydride, an unmodified polyolefin, and a rubber component such as ethylene propylene terpolymer. The modified polyolefin is e.g. polypropylene grafted with maleic anhydride.

U.S. Pat. No. 4,332,655 discloses a mixture of an adhesive copolymer of ethylene and a polar comonomer in combination with an olefin rubber. The polar comonomer can be methyl acrylate; the olefin rubber can be an ethylene-propylene copolymer with a diene modifier.

SUMMARY OF THE INVENTION

The present invention provides a coextrudable adhesive composition comprising (a) about 60 to about 95 percent of a blend of (i) about 1 to 100 percent by weight of a copolymer of ethylene with about 5 to about 40 weight percent of at least one copolymerized alkyl acrylate or methacrylate comonomer and a grafted comonomer containing pendant carboxylic acid or carboxylic acid derivative functionality, wherein the amount of said grafted comonomer comprises about 0.03 to about 2.0 percent by weight of the total adhesive composition, and (ii) 0 to about 99 percent by weight of a copolymer of ethylene with about 5 to about 40 weight percent of at least one alkyl acrylate or methacrylate comonomer, wherein the copolymer of (i) and the copolymer of (ii) are mutually compatible; and (b) about 5 to about 40 weight percent of a copolymer of about 40 to about 95 percent by weight ethylene with at least one comonomer selected from the group consisting of alpha olefins, nonconjugated dienes in an amount of 0 to about 10 weight percent, vinyl esters of carboxylic acids, styrene, alkyl acrylates, and alkyl methacrylates, wherein component (b) is incompatible with component (a).

The present invention further provides a multilayer structure comprising at least one structural layer, at least one barrier layer, and at least one layer of the above resin composition used as a bonding layer. Such structures exhibit desirable combinations of structural strength and barrier properties, with excellent adhesion between the layers.

DETAILED DESCRIPTION OF THE INVENTION

The adhesive composition of the present invention is a blend comprising about 60 to about 95 percent, and preferably about 65 to about 85 percent, of a first component which is itself preferably a blend of modified and unmodified ethylene copolymers. These copolymers of the first component are copolymers of ethylene with at least one copolymerized alkyl acrylate or methacrylate comonomer. At least one such copolymer is modified with a graft comonomer containing pendant carboxylic acid or carboxylic acid derivative functionality. The graft copolymer can constitute the entirety of the first component, but it is normally blended with a similar copolymer of ethylene and alkyl (meth)acrylate, without the graft comonomer. Such blending may be desirable in order to minimize the amount of the relatively more expensive grafted material, while maintaining the excellent adhesive properties of the composition.

The graft copolymer is based on a copolymer of ethylene with alkyl acrylate or methacrylate comonomer. Suitable comonomers include acrylates and methacrylates having alkyl groups of 1 to 20 carbon atoms, such as methyl, ethyl, propyl, isopropyl, n-butyl, isobutyl, t-butyl, n-pentyl, n-hexyl, 2-ethylhexyl, and the like. The preferred comonomer is methyl acrylate. The comonomer should comprise about 5 to about 40 weight percent, and preferably about 15 to about 30 weight percent, of the main chain of the graft copolymer. Such copolymers are prepared by well known radical initiated polymerizations. Onto this copolymer is grafted an additional comonomer containing pendant carboxylic acid or carboxylic acid derivative functionality. The melt index of the resulting graft copolymer, as measured by ASTM D1238 Condition "E", should be about 0.5 to about 40. Outside of these ranges, processing becomes more difficult, and flow instabilities may result.

The grafting monomer is selected from the group consisting of ethylenically unsaturated mono-, di-, or polycarboxylic acids and ethylenically unsaturated carboxylic acid anhydrides, including derivatives of such acids or anhydrides. Examples of the acids and anhydrides include acrylic acid, methacrylic acid, maleic acid, fumaric acid, itaconic acid, crotonic acid, itaconic anhydride, maleic anhydride, and dimethyl maleic anhydride. Examples of suitable derivatives includes salts, amides, imides, and esters of such acids or anhydrides, for example, mono- and disodium maleate and diethyl fumarate. Among the acids and anhydrides that are particularly useful are maleic anhydride and maleic acid.

The method for grafting of the comonomer onto the ethylene copolymer can be any of the processes which are well known in the art. For example, grafting can be carried out in the melt without a solvent, as disclosed in European Patent Application 0 266 994, incorporated herein by reference, or in solution or dispersion. Melt grafting can be done using a heated extruder, a Brabender ™ or Banbury ™ mixer or other internal mixers or kneading machines, roll mills, and the like. The grafting may be carried out in the presence of a radical initiator such as a suitable organic peroxide, organic perester, or organic hydroperoxide. The graft copolymers are recovered by any method which separates or utilizes the graft polymer that is formed. Thus the graft copolymer can be recovered in the form of precipitated fluff, pellets, powders, and the like.

The amount of monomer grafted onto the ethylene copolymer is not particularly limiting, and may be as low as about 0.03 weight percent or as much as about 5 percent or even more, based on the weight of the grafted ethylene copolymer. The total amount of graft monomer in the total adhesive composition, however, is important, and should be between about 0.03 and about 2 weight percent of the total composition, in order to obtain superior adhesive and bonding properties. Preferably the amount of graft comonomer is 0.03 to about 0.4 percent of the composition, and most preferably about 0.04 to about 0.3 percent.

The optional ungrafted ethylene copolymer is a copolymer similar to that described above, but without the grafted comonomer. In order to achieve good peel strength in laminated structures prepared from the present adhesive, the comonomer of the ungrafted copolymer should be of a type and amount sufficiently similar to that of the grafted copolymer that the grafted and ungrafted copolymers have a suitable degree of mutual compatibility. Such copolymers are normally compatible if the grafted and the ungrafted copolymers contain the same or closely chemically related monomers (except for the graft comonomer) and the amounts of such monomers in the two copolymers are similar. Specifically, the grafted copolymer and the ungrafted copolymer should contain at least one said copolymerized comonomer in common and the amount of each such common comonomer in the grafted copolymer and the ungrafted copolymer should be within about 10%, and preferably within about 5%, of each other. Thus if the grafted copolymer is based on an ethylene polymer containing 20 weight % methyl acrylate, the ungrafted copolymer should contain between about 10 and about 30 weight percent methyl acrylate. Small amounts of additional comonomers may also be present in one or both copolymers, but either copolymer should contain at most a sufficiently small amount of comonomer not in common with the other copolymer that the the two copolymers retain mutual compatibility. The amount of any such comomoner will normally be less than about 10% by weight, preferably less than about 7% by weight, and most preferably less than about 4% by weight, depending on the particular comonomer. Of course, closely similar comonomers, such as n-butyl acrylate and i-butyl acrylate can probably be freely interchanged while retaining compatibility. It is preferred, however, that the graft copolymer be the same as the ungrafted copolymer, in terms of identity and amount of comonomers, except for the presence of the grafted monomers. The melt index of the ungrafted copolymer should be about 0.05 to about 40.

The graft copolymer can comprise about 1 to 100 percent of the first component, and the ungrafted copolymer 0 to about 99 percent. Preferably the graft copolymer comprises about 5 to about 20 percent of the first component.

The second component of the blend is at least one ethylene copolymer which, however, is substantially incompatible with the first component. That is, upon melt blending of the composition of the present invention, the second component forms distinct microscopic domains within the continuous phase of the first component. There is, however, sufficient macroscopic compatibility that the composition as a whole retains good physical properties. The second component comprises about 5 to about 40 percent of the composition, preferably about 15 to about 35 percent.

The copolymer of the second component is a copolymer of about 40 to about 95 percent by weight ethylene with at least one comonomer selected from the group consisting of alpha olefins, nonconjugated dienes (normally present in an amount of 0 to about 10 weight percent), vinyl esters of carboxylic acids, styrene, alkyl acrylates, and alkyl methacrylates. Suitable specific comonomers include the alkyl acrylates and methacrylates described above, vinyl acetate, vinyl propionate, vinyl butyrate, and the like, alpha olefins of 3 to 20 carbon atoms such as propylene, butene, pentene, hexene, and the like, and nonconjugated dienes such as 1,4-hexadiene, dicyclopentadiene, methylene norbornene, ethylidene norbornene, and the like.

The nonconjugated diene comonomer is preferably used in combination with an alpha olefin of 3–20 carbon atoms, so as to form an ethylene-based elastomer. The most widely known of such elastomers, and one of the preferred copolymers of the present invention, is EPDM, a copolymer of ethylene, 20–30 percent propylene, and 2–8 percent 1,4-hexadiene. Similarly, ethylene-propylene elastomers containing about 30 to about 50 percent propylene and no diene are satisfactory. Such elastomers can also be modified by grafting with any of the graft comonomers described above, preferably maleic anhydride. EPDM grafted with maleic anhydride has been found to impart to the adhesive compositions desirable optical properties such as lowered haze and better transmittance.

Styrene/ethylene-butylene block copolymers can also be used as the second component of the adhesive blend.

The polymer of the second component of the blend can also be an ethylene alkyl acrylate or methacrylate, much like the polymers of the first component. However, this copolymer must be sufficiently different from the first component to be incompatible or microscopically immiscible therewith, as described above. Thus the requirements for miscibility, described in some detail above for the polymers of the first component, should be avoided in selecting the second component, if it is to be a copolymer of this type. Thus the identity of the comonomer of the polymer of the second component may be different from that of the first (in other than a trivial way, e.g. n-butyl versus isobutyl acrylate). Alternatively the amount of the comonomer can differ between the two components by greater than about 10 percent. Or the polymer can contain an additional comonomer not present in the first component, in an amount sufficient to create incompatibility. (The specific amount may vary from comonomer to comonomer.) In particular, addition of comonomers selected from the group consisting of acrylic acid, methacrylic acid, a monoalkyl ester of an unsaturated dicarboxylic acid, glycidyl acrylate, and glycidyl methacrylate at at least a certain minimum level gives a copolymer sufficiently distinct from that of the first component as to be suitable for the present invention. A suitable minimum level of such comonomer in some cases is about 4 weight percent; preferably at least about 7% or even 10% or more will be present. The important feature in the present invention is microscopic compatibility or incompatibility among the polymeric components; numerical rules or compositional limits should not be viewed as rigid limitations. Incompatibility between the first and second components can be determined by observing phase separation of the two components, through such techniques as transmission electron microscopy. The second component of the present composition is normally present as randomly dispersed, distinct and separate particles of dimensions of about 0.1 micrometers or larger, within the continuous matrix phase of the first component.

In addition to the above mentioned components, the adhesive resin may contain small amounts of other materials commonly used and known in the art, such as antioxidants, stabilizers, and fillers.

The adhesive resin composition is prepared by blending the above described components by any suitable means, such as melt blending, extruding, etc. The composition provides excellent adhesion in a composite structure containing a structural layer of a polyester resin, a vinyl chloride resin, a styrene copolymer resin, or a polycarbonate resin, and a barrier layer such as polyamide or ethylene vinyl alcohol copolymer. The adhesive also exhibits excellent adhesion to polyolefin resins. The combination of processability and barrier properties provided by such composite structures make them useful in applications such as packaging, disposable containers, etc.

EXAMPLES

Examples 1-15 and Comparative Examples C1-C4

Adhesive blends having a composition as indicated in Table I were prepared by dry blending the components in a polyethylene bag and subsequently melt blending in a 28 or 30 mm Werner and Pfleiderer TM extruder with a vacuum port. The melt temperature was 220-230° C. unless otherwise indicated. All the blends reported herein contained 0.1 weight % Irganox TM 1010 hindered polyphenol stabilizer (not separately reported in the Tables).

In Table 1 EMA refers to a copolymer of ethylene with 20 weight % methyl acrylate, melt index 6 dg/min. The modified EMA is the same copolymer on which has been grafted maleic anhydride ("MAnh"). The % MAnh listed in Table I is the calculated weight percent of maleic anhydride-derived moieties in the entire adhesive composition. In the column for thermoplastics, EPDM refers to a terpolymer of ethylene with 23 % propylene and 6.4 % 1,4-hexadiene. EBAGMA is a terpolymer of ethylene, 28 weight percent n-butyl acrylate, and 1.4% glycidyl methacrylate. EBA is a copolymer of ethylene and 16 weight % n-butyl acrylate. ULLDPE 1 and ULLDPE 2, respectively, are ultralow linear low density polyethylene from Dow, grades 4001 and 4003, respectively. SEBS1 and SEBS2 are styrene-ethylene-butylene-styrene block copolymers from Shell Chemical, Kraton TM grades G1651 and G1652, having molecular weights of about 175,000 and 45,000 to 55,000, respectively. EVA is a copolymer of ethylene with 28 weight % vinyl acetate, melt index 6 dg/min.

The adhesive blends were coextruded between a layer of a high melt viscosity amorphous copolyester of ethylene glycol copolymerized with about 86 percent terephthalic acid and about 14 percent isophthalic acid, further containing 0.4 weight percent comonomer moieties derived from trimellitic acid, on one side, and a layer of copolymer of ethylene with 30 mole % vinyl alcohol comonomer, on the other side, to form a three-layered structure. The adhesive blends were melted at 250° C. in a 25.4 mm extruder, and the melt stream was fed to a coextrusion die so as to form the middle layer. The copolyester layer was fed through a 38.1 mm extruder at 270° C. (Examples 1-8 and Comparative Examples C1-C4) or 240.° C. (Examples 9-15). The EVOH layer was likewise fed through a 38.1 mm extruder at 240° C. The combined extrudate was run onto chill rolls at about 70° C. The takeup speed for the sheet was about 1.5 m/min. The thickness of the layers is indicated in Table I.

The multilayered structures thus prepared were evaluated by measuring their peel strength. Peel strength was measured by ASTM D 1876-72, modified in that the test was run at 305 mm/min, rather than 254 mm/min, and 3 to 6 duplicates of each sample were measured, rather than 10. Results from this test, in a "T" configuration, are indicated in Table I.

The result show that addition of a thermoplastic polymer, in addition to the ethylene copolymer and modified ethylene copolymer, results in improved peel strength. In the absence of the thermoplastic additive, compositions having 0.03 to 0.21 % maleic anhydride exhibit peel strengths of about 210-280 N/m. Addition of 20-30 percent EPDM increases the peel strength by a factor of 3.7 to 4.3, providing a peel strength of in excess of 1200 N/m. Comparative Example C4, in which a relatively high level of maleic anhydride graft is present, exhibits comparatively good peel strength even without addition of the thermoplastic component. But even this composition is significantly improved by addition of EPDM. Examples 9-15 show that excellent peel strength is obtained using ethylene copolymers other than EPDM. (One grade of styrene-ethylene-butadiene-styrene block copolymer seems to exhibit little improvement. The reason for this difference is not clear, since it appears that the two grades of block copolymer differ only in molecular weight.) The thickness of the polymeric layers does not play an important role in the peel strength within the limits illustrated.

TABLE I

| Ex. | Adhesive | | | | | | Polyester Thickness μm | EVOH Thickness μm | T Peel N/m |
|---|---|---|---|---|---|---|---|---|---|
| | % EMA | Modified EMA, % | % MAnh | Thermoplastic type | % | Thickness μm | | | |
| C1 | 98.0 | 2.0 | 0.03 | — | 0 | 41 | 203 | 41 | 210 |
| 1 | 68.0 | 2.0 | 0.03 | EPDM | 30 | 13 | 183 | 43 | 719 |
| C2 | 91.4 | 8.6 | 0.12 | — | 0 | 18 | 152 | 43 | 281 |
| 2 | 71.4 | 8.6 | 0.12 | EPDM | 20 | 23 | 196 | 41 | 754 |
| 3 | 71.4 | 8.6 | 0.12 | " | 20 | 36 | 168 | 43 | 771 |
| 4 | 61.4 | 8.6 | 0.12 | " | 30 | 23 | 198 | 33 | 1017 |
| C3 | 85.0 | 15.0 | 0.21 | — | 0 | 30 | 183 | 23 | 281 |
| 5 | 65.0 | 15.0 | 0.21 | EPDM | 20 | 23 | 236 | 51 | 929 |
| 6 | 55.0 | 15.0 | 0.21 | " | 30 | 13 | 160 | 36 | 894 |
| 7 | 55.0 | 15.0 | 0.21 | " | 30 | 25 | 211 | 36 | 1210 |
| C4 | 75.0 | 25.0 | 0.35 | — | 0 | 33 | 208 | 64 | 789 |
| 8 | 55.0 | 25.0 | 0.35 | EPDM | 20 | 33 | 135 | 48 | 999 |
| 9 | 70.0 | 10.0 | 0.14 | EBAGMA | 20 | 23 | 168 | 56 | 368 |
| 10 | 70.0 | 10.0 | 0.14 | EBA | 20 | 33 | 132 | 64 | 929 |
| 11 | 70.0 | 10.0 | 0.14 | ULLDPE1 | 20 | 23 | 163 | 64 | 929 |
| 12 | 70.0 | 10.0 | 0.14 | ULLDPE2 | 20 | 41 | 175 | 33 | 807 |
| 13 | 70.0 | 10.0 | 0.14 | SEBS1 | 20 | 36 | 160 | 41 | 754 |
| 14 | 70.0 | 10.0 | 0.14 | SEBS2 | 20 | 23 | 175 | 36 | 281 |
| 15 | 70.0 | 10.0 | 0.14 | EVA | 20 | 33 | 168 | 36 | 807 |

Examples 16–23.

Samples described in Table II were prepared as in Example 1 except that the amorphous polyamide was a copolymer of ethylene glycol with about 83 percent terephthalic acid and about 17 percent isophthalic acid derived moieties. Extrusion temperature was 265° C. In Table II, EMAMAME is a terpolymer of ethylene with 23 weight percent methyl acrylate and 4 weight percent ethyl hydrogen maleate. EnBAMAA is a terpolymer of ethylene with 22 weight percent n-butyl acrylate and 9 weight percent methacrylic acid.

The results in Table II show that the compositions using both EPDM and other ethylene polymers within the scope of the present invention exhibit good peel strength.

The thermoplastic material was an EPDM grafted with about 2 percent maleic anhydride derived moieties. The results are shown in Table III.

Addition of the EPDM-g-MAnh significantly improves the peel strength of the adhesive, as shown in Table III, in much the same way as does addition of ungrafted EPDM (compare the results in Table I). Comparative Example C6 shows that the addition of EPDM-g-MAnh even to unmodified EMA alone results in some minor improvement in peel strength, but Example 25 shows that the composition, within the scope of the invention, is significantly superior. It appears that the maleic anhydride which is gafted onto the EPDM is not as important in providing improved peel strength as is the maleic anhydride that is grafted on the EMA. The compositions involving grafted EPDM,

TABLE II

| Ex. | Adhesive | | | | | | Polyester Thickness μm | EVOH Thickness μm | T Peel N/m |
|---|---|---|---|---|---|---|---|---|---|
| | % EMA | Modified EMA, % | % MAnh | Thermoplastic type | % | Thickness μm | | | |
| 16 | 75 | 5 | 0.06 | EPDM | 20 | 20 | 163 | 76 | 789 |
| 17 | 70 | 10 | 0.11 | " | 20 | 10 | 142 | 81 | 579 |
| 18 | 70 | 10 | 0.11 | " | 20 | 30 | 193 | 84 | 561 |
| 19 | 65 | 10 | 0.11 | " | 25 | 41 | 168 | 71 | 614 |
| 20 | 55 | 10 | 0.11 | " | 35 | 71 | 183 | 25 | 649 |
| 21 | 65 | 15 | 0.16 | " | 20 | 20 | 132 | 84 | 894 |
| 22 | 70 | 10 | 0.11 | EMAMAME | 20 | 41 | 152 | 71 | 577 |
| 23 | 70 | 10 | 0.11 | EnBAMAA | 20 | 51 | 183 | 41 | 473 |

Examples 24–26 and Comparative Examples C5–C6 however, do exhibit reduced haze and improved light transmission.

TABLE III

| Ex. | Adhesive | | | | | | Polyester Thickness μm | EVOH Thickness μm | T Peel N/m |
|---|---|---|---|---|---|---|---|---|---|
| | % EMA | Modified EMA, % | % MAnh[a] | Thermoplastic type | % | Thickness μm | | | |
| C5 | 90 | 10 | 0.12 | — | 0 | 20 | 183 | 127 | 175 |
| C6 | 80 | 0 | 0.40 | EPDM-g-Manh | 20 | 51 | 203 | 51 | 316 |
| 24 | 81 | 9 | 0.33 | " | 10 | 13 | 168 | 79 | 386 |
| 25 | 71 | 9 | 0.53 | " | 20 | 13 | 94 | 94 | 491 |
| 26 | 61 | 9 | 0.73 | " | 30 | 28 | 198 | 71 | 999 |

[a] Total from modified EMA and modified EPDM

Blends and laminar structures were prepared as in Example 1. The adhesive blends were extruded at 230° C. through 25.4 extruder; the copolyester layer was extruded at 240° C. through a 38.1 mm extruder; the EVOH was fed at 230° C. through a 28.1 mm extruder.

Examples 27 and 28 and Comparative Examples C7–C9.

An adhesive blend as indicated in Table IV was extruded between a layer of polycarbonate (Makrolon TM FCR 2458 from Mobay) and a layer of the EVOH of Example 1. The adhesive blends were melt compounded at 190 or 230° C., as indicated, in a 25.4 mm extruder, the melt stream of which fed into a coextrusion die as in Example 1. The other processing conditions were as indicated in Example 1; the polycarbonate was extruded at 255° C., the EVOH at 235° C.

The results in Table IV show that addition of EPDM significantly increases the peel strength in a laminar structure with polycarbonate. Under the conditions of these experiments, the final peel strength is also influenced by the extrusion temperature of the adhesive as well as the melt index of the EMA. Thus it is important that comparisons be made only between matched experiments.

TABLE IV

| Ex. | % EMA | Modified EMA, % | % MAnh | Adhesive Thermoplastic type | % | Extrusion temp °C. | Thickness μm | Polycarb. Thickness μm | EVOH Thickness μm | T Peel N/m |
|-----|-------|-----------------|--------|------------------------------|-----|--------------------|--------------|------------------------|-------------------|------------|
| C7  | 90$^a$ | 10 | 0.12 | — | 0 | 190 | 41 | 198 | 84 | 421 |
| 27  | 70$^a$ | 10 | 0.12 | EPDM | 20 | 190 | 23 | 198 | 56 | 877 |
| 28  | 70$^a$ | 10 | 0.12 | EPDM | 20 | 230 | 36 | 195 | 69 | 1157 |
| C8  | 90$^b$ | 10 | 0.12 | — | 0 | 190 | 15 | 671 | 78 | 719 |
| C9  | 90$^b$ | 10 | 0.12 | — | 0 | 230 | 36 | 239 | 56 | 1087 |

$^a$Melt index of EMA = 6 dg/min
$^b$Melt index of EMA = 2 dg/min

Comparative Examples C10–C12.

Laminar structures were prepared substantially as in Example 1. The layer of EVOH, however, was replaced with a layer of high density polyethylene. The polyester was a grade of polyethylene terephthalate toughened by addition of ionomer and linear low density for polyethylene. All extruders used were 25.4 mm. The polyester was extruded at 325° C., the adhesive blend at 243° C., and the polyethylene at 230° C. The components of the adhesive, as shown in Table V, do not include modified ethylene copolymer. The results indicate that the addition of EPDM to EMA leads to a modest improvement in adhesion to polyester and polyethylene, even when graft modified EMA is not included in the blend.

TABLE V

| Ex. | % EMA | Adhesive Thermopl. type | % | Thickness μm | Polyester Thickness μm | Polyeth. Thickness μm | T Peel N/m |
|-----|-------|--------------------------|---|--------------|------------------------|------------------------|------------|
| C10 | 100 | — | 0 | 20 | 48 | 18 | 268 |
| C11 | 100 | — | 0 | 15 | 23 | 15 | 227 |
| C12 | 80 | EPDM | 20 | 20 | 18 | 20 | 428 |

I claim:

1. A coextrudable adhesive composition consisting essentially of:
   (a) about 60 to about 95 percent of a blend of:
      (i) about 1 to 100 percent by weight of a copolymer of ethylene with about 5 to about 40 weight percent of at least one copolymerized alkyl acrylate or methacrylate comonomer and a grafted comonomer containing pendant carboxylic acid or carboxylic acid anhydride functionality, wherein the amount of said grafted comonomer comprises about 0.03 to about 2.0 percent by weight of the total adhesive composition, and
      (ii) 0 about 99 percent by weight of a copolymer of ethylene with about 5 to about 40 weight percent of at least one alkyl acrylate or methacrylate comonomer, wherein the copolymer of (i) and the copolymer of (ii) are mutually compatible; and
   (b) about 5 to about 40 weight percent of a copolymer of about 40 to about 95 percent by weight ethylene with at least one comonomer selected from the group consisting of alpha olefins, nonconjugated dienes in an amount of 0 to about 10 weight percent, vinyl esters of carboxylic acids, styrene, alkyl acrylates, and alkyl methacrylates, wherein component (b) is incompatible with component (a).

2. The coextrudable adhesive composition of claim 1 wherein the amount of grafted comonomer in component (a)(i) comprises about 0.03 to about 0.4 percent by weight of the total adhesive composition.

3. The coextrudable adhesive composition of claim 1 wherein the amount of grafted comonomer in component (a)(i) comprises about 0.05 to about 0.3 percent by weight of the total adhesive composition.

4. The coextrudable adhesive composition of claim 1 wherein the copolymer of (a)(i) and the copolymer of (a)(ii) contain at least one said copolymerized comonomer in common, the amount of each such common comonomer in the copolymer of (ii) being within about 10% of the amount of the corresponding comonomer in copolymer (i), and the total amount of said copolymerized comonomers other than such common comonomers in either copolymer being less than about 10%.

5. The composition of claim 4 wherein each comonomer in the copolymer of (a)(ii) is within about 5% of the amount of the corresponding comonomer in the copolymer of (a)(i).

6. The composition of claim 5 wherein the copolymer of (a)(i) and the copolymer of (a)(ii) consist of the same copolymerized comonomers.

7. The adhesive composition of claim 6 wherein the copolymer of (a)(i) is a binary copolymer of ethylene and about 15 to about 30 weight percent copolymerized methyl acrylate.

8. The coextrudable adhesive composition of claim 4 wherein component (b) is a copolymer of ethylene and at least one alkyl acrylate or methacrylate comonomer wherein such copolymer differs from the copolymers of (a) in the identity of said comonomers.

9. The coextrudable adhesive composition of claim 4 wherein component (b) is a copolymer of ethylene and at least one alkyl acrylate or methacrylate comonomer wherein such copolymer differs from the copolymers of (a) in further comprising a comonomer selected from the group consisting of acrylic acid, methacrylic acid, a monoalkyl ester of an unsaturated dicarboxylic acid, glycidyl acrylate, and glycidyl methacrylate.

10. The adhesive composition of claim 1 wherein component (b) is a copolymer of ethylene with about 10 to about 40 weight percent of an alpha olefin of 3 to 20 carbon atoms and 0 to about 10 weight percent of a non-conjugated diene.

11. The adhesive composition of claim 10 wherein component (b) is a copolymer of ethylene with about 20 to about 30 weight percent propylene and about 2 to about 8 weight percent 1-4-hexadiene.

12. The adhesive composition of claim 7 wherein component (b) is a copolymer of ethylene with about 10 to about 40 weight percent of an alpha olefin of 3 to 20 carbon atoms and 0 to about 10 weight percent of a non-conjugated diene.

13. The adhesive composition of claim 12 wherein component (b) is a copolymer of ethylene with about 20 to about 30 weight percent propylene and about 2 to about 8 weight percent 1-4-hexadiene.

14. The adhesive composition of claim 13 wherein the copolymer of ethylene, propylene, and diene is grafted with a comonomer containing pendant anhydride functionality.

15. The adhesive composition of claim 11 wherein the amount of grafted comonomer in the composition is about 0.03 to about 0.4 weight percent.

16. The adhesive composition of claim 11 wherein the amount of grafted comonomer in the composition is about 0.05 to about 0.3 weight percent.

17. The adhesive composition of claim 1 wherein the amount of component (a) is about 65 to about 85 percent and the amount of component (b) is about 15 to about 35 weight percent.

18. The adhesive composition of claim 1 wherein the amount of the grafted copolymer of (a)(i) comprises about 5 to about 20 weight percent of the blend of (a).

19. The composition of claim 1 wherein the carboxylic acid or carboxylic acid derivative is acrylic acid, methacrylic acid, maleic acid, fumaric acid, itaconic acid, crotonic acid, itaconic anhydride, maleic anhydride, dimethyl maleic anhydride monosodium maleate, maleic anhydride and maleic acid.

20. The composition of claim 1 wherein the carboxylic acid or carboxylic acid derivative is an anhydride.

21. The composition of claim 20 wherein the anhydride is maleic anhydride.

22. The composition of claim 1 wherein the amount of the grafted copolymer of (a)(i) comprises about 1 to about 31 weight percent and the amount of the ungrafted copolymer of (a)(ii) comprises about 69 to about 99 weight percent of the blend of (a).

* * * * *